R. A. GALLY.
VALVE OF COUNTERBALANCED TYPE.
APPLICATION FILED JUNE 30, 1917.
1,256,466.  Patented Feb. 12, 1918.
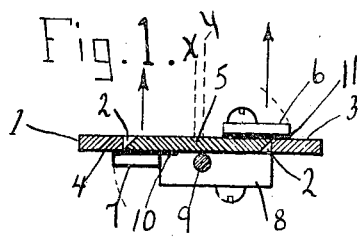
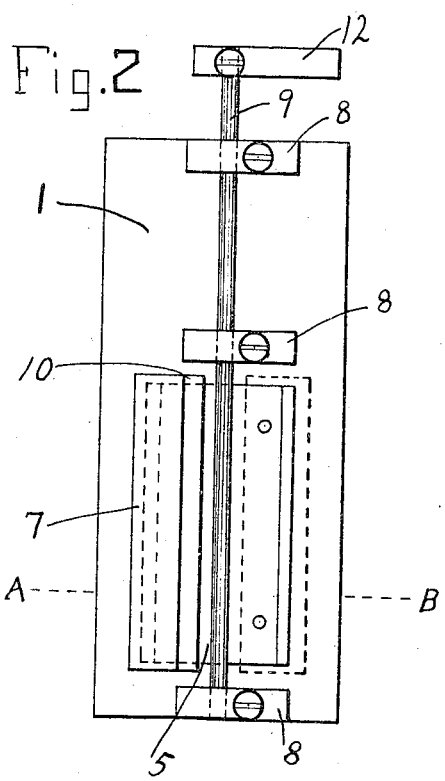
Witnesses:
Herschel E. Tower.
Wm Stanhope.
Inventor:
Robt. A. Gally

UNITED STATES PATENT OFFICE.

ROBERT A. GALLY, OF CINCINNATI, OHIO, ASSIGNOR TO THE BALDWIN COMPANY, OF CINCINNATI, OHIO.

VALVE OF COUNTERBALANCED TYPE.

1,256,466.  Specification of Letters Patent. Patented Feb. 12, 1918.

Application filed June 30, 1917. Serial No. 178,004.

*To all whom it may concern:*

Be it known that I, ROBERT A. GALLY, a citizen of the United States, and residing at Cincinnati, in the county of Hamilton and State of Ohio, have invented certain new and useful Improvements in Valves of Counterbalanced Type, of which the following is a specification.

In prior structures, balanced oscillating or partially revoluble vane valves positioned to control wind ports, have had rigid extensions from the two moving edges of such a valve, each such extension lapping over and seating on the marginal face of the seat block adjacent thereto, but such rigid extensions have required very close fitting of the bearings on which the valve rocked and of the seating faces of the said extensions and the adjacent seats to prevent loss of air, as otherwise a slight lost motion in the bearing, or any error of the faces, would cause leakage when the valve was at closed position.

Such tendency to leakage is especially objectionable in such structures as musical instruments, where small power is available for closing the valve, and a very slight leakage is troublesome.

To avoid such difficulties, the present invention has a rigid extension from one moving edge of the valve, and a yielding extension or seal from the other moving edge, the yielding extension being usually best employed at the edge of the valve where such yielding extension is drawn toward the seat by the air current.

The air suction on a vane valve having flaps, seals or lips extended from its two moving edges over the adjacent seats of its support, exerts a greater pull on the lip that is sucked toward its seat, than the pull on the lip that is sucked away from its seat, but to insure a very certain closing of the valve against leakage, the present structure has that part of the valve whose lip is sucked toward its seat, proportioned of greater surface than the other part of the valve at the other side of the bearing on which this vane valve oscillates. This feature of overbalancing is especially useful to assist the sealing of such a vane valve with a yielding lip, as will be more fully described below.

In the drawings, Figure 1 is an end view of the improved valve, being a section taken on line *a*, *b* of Fig. 2; and Fig. 2 is a plan view from beneath.

A plate or other suitable bed or support 1 has an opening or port 2 through the said support and its two main sides or faces 3 and 4. These faces are preferably made parallel to each other for ease of finishing, although they may be otherwise disposed so long as they permit the suitable seating of the two moving parts of the vane valve 5 or the like. Such moving parts of the valve are here shown as the extension or lip 6 which is rigid with the valve 5 and extends beyond the one moving edge of said valve 5 and overlaps the face or seat 3 of the support 1, while a flexible or yielding extension or lip 7 extends beyond the valve 5 from its moving edge at the other side of the bearings 8 and 9 on which said valve 5 oscillates, said yielding lip 7 overlapping the face 4 of the support 1 adjacent to the port 2. The rigid lip 6 and the face 3 are on the opposite side of the valve 5 and the support 1 from the yielding lip 7 and the face 4, so that the oscillating motion of the valve 5 will move these two lips 6 and 7 to or from the respective seats 3 and 4 at the same time. It will be understood that the rigid lip 6 may be either attached to or formed integrally with the valve 5 as may be more convenient, and that the yielding lip 7 may be a stiff strip 7 attached to the valve 5 by a flexible hinge 10 of leather as here shown, or made of one piece of flexible leather or other material, or in any other suitable manner, the present invention residing in the use of one rigid lip and one yielding lip to secure the improved tight closing of the valve irrespective of the exact detail of these parts. The leather 10 is preferably made to cover the entire lip 7 to aid tight and quiet seating, and the rigid lip 6 is also improved by a leather facing 11 on the face of said lip toward the seat 3 of the support 1.

Blocks or bearings 8 are fixed with the support 1 and a revoluble shaft or bearing 9 is fixed with the valve 5 and is carefully fitted in the holes of the bearings 8 so that the valve 5 may be easily partially revolved or oscillated so that its extensions or lips 6 and 7 are moved to and from the seats 3 and 4 to open and close or vary the amount of opening of air flow through the port 2. The motion of valve 5 may be controlled by a crank 12 attached to its shaft 9; or by any other suitable means. Any other suitable bearings may be used, so that the common axis is parallel to the planes of the seats 3 and 4 and the lips 6 and 7 and is intermediate the main lines of the lips 6 and 7.

The valve shaft or bearing 9 and the support bearings 8, are shown with their common axis $y$ a small distance to the right of the half measure $x$ between the two edges $a$, $b$, of the port 2 at the faces 3 and 4 of the support 1, the axis and bearings thus being nearer that edge of the valve having the rigid lip than to that edge having the yielding lip. This offset of the axis $y$ adds to the seating tendency of the valve 5 from the air current, which is in direction of the arrows, thus pulling the lip 7 to its seat 4 with that much greater excess of power over the pull of the lip 6 away from its seat 3 by the same air-current than if the axis $y$ of the valve bearings were positioned at the half distance $x$. Such offsetting of the axis may be used whether one lip is rigid and the other yielding, or both rigid, or both yielding. The special structure of the yielding lip 7 may be employed with the bearings 8 and 9 set as shown to increase the closing action of the valve 5, or with their axes midway the valve and port as just mentioned, or the axis $y$ may be set to the other side of the said median line $x$ to thereby balance or to partly or wholly overcome or exceed the seating tendency of the valve or its lip 6 when any such conditions are desired, and this novel yielding lip be subject to the claims thereon included in this patent, although some of the above-mentioned specific variations of the position of the axis of the valve, not being claimable in this patent, are shown and claimed in a separate application.

Although a valve of rectangular form is very convenient for the employment of the present invention, and so also is the use of thin plate metal or other suitable material, yet this invention is not limited to such details, but—

What I claim as my invention is:—

1. A support having two faces and a port through the said support and the said two faces; a vane valve to said port; a bearing on said support intermediate the width of its said port, and a revoluble bearing on said valve intermediate its width and engaging the said bearing on said support; a lip rigid with said valve and extended beyond the edge of said valve that is at one side of the said bearings, and further extended beyond the adjacent edge of the said support, and opposite to one of the said faces of the support; and a yielding lip carried by and extended from the edge of the said valve that is at the other side of the said bearings, and extended beyond the adjacent edge of the said support and opposite to the other said face of the said support.

2. A support having a port therein; a valve partially revoluble in said port; bearings on said support and valve in one axial line intermediate the width of said valve and on which said valve is adapted to partially revolve; a lip rigid with said valve, substantially parallel with said axial line, and extended from one edge of the said valve beyond the adjacent edge of the port of the said support and positioned to contact the face of said support adjacent its said edge; and a yielding lip extended from the said valve at its edge that is at the other side of the said axial line and overlapping the adjacent face of the said support on the opposite face of said support to that contacted by the rigid lip.

3. A support having two faces and a port through said support and both said faces; a revoluble valve to said port; bearings on said support and valve all in one axial line, and having the axis thereof in similar plane with and adjacent to one of said faces of said support and intermediate two of the edges of said valve; a lip rigid with and extended from one of the said edges of said valve beyond the adjacent edge of the support at one side of the port from the said axial line and adapted to contact that one of the said faces of the said support adjacent that edge of the said support; and a yielding lip attached to and extended from said valve at its edge that is at the other side of the said axis, and overlapping the said support on the opposite face of said support to that which is contacted by the rigid lip.

4. A plate-like support having two substantially parallel faces and a rectangular port through said support and both said faces; a rectangular plate-like valve in said port and in similar plane with the two said faces of the support; bearings on said support and said valve and in one axial line approximating the said planes of said support and valve and on which said valve is adapted to be partially revolved; a lip rigid with said valve and extended from one edge of said valve parallel to said axial line and beyond the adjacent edge of said support and opposite to and adapted to contact with the one face of said support adjacent its said edge; and a lip extended from said valve at its edge that is at the other side of said axial line, and said lip extended beyond the adjacent edge of the said support and opposite to and adapted to contact with the face of said support adjacent its said edge, and on the opposite face of said support than the face adjacent to said first named and rigid lip, said second named lip having a yielding motion in direction of its contact to the adjacent face of the support.

5. A support having two faces and a port through the said support and the said two faces; a vane valve to said port; a bearing on said support intermediate the width of its said port, and a revoluble bearing on said valve intermediate its width and engaging the said bearing on said support; a lip rigid with said valve and extended beyond the edge of said valve that is at one side of the said bearings, and further extended beyond the adjacent edge of the said support, and opposite to one of the said faces of the support; and a yielding lip carried by and extended from the edge of the said valve that is at the other side of the said bearings, and extended beyond the adjacent edge of the said support and opposite to the other said face of the said support, the revoluble bearing of said valve being nearer to the edge of the valve having the rigid lip than to that edge of the valve having the yielding lip.

6. A support having two faces and a port through said support and its said two faces; a vane valve to said port; a bearing on said support intermediate the width of its said port, and a revoluble bearing on said valve intermediate its width and engaging the said bearing on said support; a lip carried by and extended beyond the edge of said valve that is at one side of the said bearings, and further extended beyond the adjacent edge of the said support and opposite to one of the said faces of the support, another lip carried by and extended beyond the edge of said valve that is at the other side of the said bearings, and extended beyond the adjacent edge of the said support and opposite to the other said face of the said support; the revoluble bearing of said valve being farther from the edge of the said valve that is seated in the direction of the flow of fluid through said port than from the other edge of said valve.

ROBT. A. GALLY.

Witnesses:
PAUL HEUGGE,
NORMA KEISER.

Copies of this patent may be obtained for five cents each, by addressing the "Commissioner of Patents, Washington, D. C."